United States Patent [19]
Finnell

[11] 3,925,564
[45] Dec. 9, 1975

[54] METHOD OF CURING AND DRYING WILD RICE

[76] Inventor: Ned W. Finnell, Route 4, Hayward, Wis. 54843

[22] Filed: July 22, 1974

[21] Appl. No.: 490,520

[52] U.S. Cl. ............... 426/418; 426/456; 426/459; 426/460; 426/482; 426/809; 426/419
[51] Int. Cl.² .......................................... A23B 4/04
[58] Field of Search .......... 426/456, 418, 419, 459, 426/460, 462, 482, 481, 809

[56] References Cited
UNITED STATES PATENTS
1,035,839   8/1912   Anderson ........................... 426/462

OTHER PUBLICATIONS
Houston; Rice Chemistry & Technology; Publisher: American Association of Cereal Chemists, St. Paul, Minn. 1972; pp. 181, 188–193, 172–174, 180.

*Primary Examiner*—S. Leon Bashore
*Assistant Examiner*—Kenneth M. Schor
*Attorney, Agent, or Firm*—Mason, Kolehmainen, Rathburn & Wyss

[57] ABSTRACT

A method of dehulling wild rice kernels which comprises moistening said rice kernels at a temperature not greater than 55°F. to a moisture content of 45–50% on a weight basis, maintaining said rice kernels at a temperature not greater than 55°F. and at a moisture content of 45–50% until the hulls of said kernels turn brown, drying said kernels to a moisture content of 6-8% on a weight basis, and thereafter dehulling said kernels to produce grain.

2 Claims, No Drawings

METHOD OF CURING AND DRYING WILD RICE

This invention relates to a process of dehulling wild rice kernels. More particularly, it relates to a method of treating wild rice to remove the hulls therefrom to provide grain for further treatment and cooking.

Kernels of unprocessed wild rice from natural stands or from commercial paddies are washed with water, at a temperature below 50°F., preferably at 45–50°F., to remove sand and to adjust the temperature of the rice kernels to approximately 50°F. and a moisture content of 40–50% on a weight basis.

The rice kernels are then stored, either sacked or in bulk, at a temperature not greater than 55°F. for a period of about 7 to 21 days, depending upon the maturity of the rice, the more mature rice requiring a shorter time. During this storage period, water is added from time to time to maintain a moisture content (weight basis) of 45–50% in the rice. The temperature is maintained at 55°F. or lower to control the consumption of rice by insects which are usually present, particularly the rice worm, the insects being dormant at temperatures below 55°F. The storage of the rice during this period can be either indoors or outdoors depending upon the temperature of the outside air. Preferably, storage in a refrigerated room with commercial air conditioning is the most desirable.

The procedure described above is called "curing" and is continued until the rice hulls begin to or have turned brown. At this point the rice is dried, preferably in a rotary, continuous flow dryer or parcher, particularly the apparatus built by Chief Industries, Inc. of Hayward, Wisconsin. In the drying or parching process, the air in the dryer is maintained at a temperature of 300–350°F., depending upon the volume of rice being dried, and the rice is passed through the dryer in a period of 30–60 minutes, again depending upon the volume of rice being treated. During this procedure, the rice is dried from a moisture content of 45–50% down to a moisture content of 6–8% on a weight basis.

The apparatus which is used for the drying of the rice preferably is of a rotary design in tubular form with interior flights of 2–15°. The rice passes through the rotary dryer, which is oriented at an angle to the horizontal so that the rice fed into the upper end will pass to the lower end and out into a receptacle in a period of 30 to 60 minutes. Throughout the operation, the interior of the tubular dryer is preferably maintained between 300–350°F. The rice passing through the dryer may reach a temperature of 300°F., although it is generally preferable to maintain the rice temperature not greater than 250°F. The rice temperature can be maintained at a desired level by adjusting the temperature of the dryer and the rate of throughput of the moistened rice.

The rice that is received from the rotary dryer with a moisture content of 6–8% is then ready for dehulling by standard dehulling operations. The grains of rice so obtained can then be gelatinized or otherwise treated in conventional fashion for food purposes.

The wild rice treated according to this specification is *Zizania aquatica*, although it can also be *Zazania latifolia*.

I claim:

1. A method of dehulling wild rice kernels which comprises moistening said rice kernels at a temperature not greater than 55°F. to a moisture content of 45–50% on a weight basis, maintaining said rice kernels at a temperature not greater than 55°F. and at a moisture content of 45–50% for 7–21 days until the hulls of said kernels turn brown, drying said kernels to a moisture content of 6–8% on a weight basis, and thereafter dehulling said kernels to produce grain.

2. Method of claim 1 wherein the wild rice is *Zizania aquatica*.

* * * * *